United States Patent [19]

Bailey et al.

[11] 4,339,652
[45] Jul. 13, 1982

[54] POWER SUPPLY FOR PERCUSSION WELDING

[75] Inventors: Cecil Bailey, Woodlyn; Albert C. Young, Springfield; Dezso D. Thold, Wayne, all of Pa.

[73] Assignee: General Electric Company, Philadelphia, Pa.

[21] Appl. No.: 221,131

[22] Filed: Dec. 29, 1980

[51] Int. Cl.[3] .............................................. B23K 9/22
[52] U.S. Cl. ..................................... 219/95; 219/113
[58] Field of Search ..................................... 219/95, 113

[56] References Cited

U.S. PATENT DOCUMENTS

| 2,473,927 | 6/1949 | White | 219/95 |
| 3,136,880 | 6/1964 | Glorioso | 219/98 |
| 3,171,011 | 2/1965 | English | 219/98 |
| 3,319,039 | 5/1967 | Glorioso | 219/98 |
| 3,423,560 | 1/1969 | Brennen | 219/98 |
| 3,505,494 | 4/1970 | Ruetschi | 219/95 |
| 3,564,191 | 2/1971 | Elzer et al. | 219/113 |
| 3,764,778 | 10/1973 | Tauern | 219/131 |
| 3,805,143 | 4/1974 | Tauern | 321/15 |

FOREIGN PATENT DOCUMENTS 462681  5/1975  U.S.S.R. ............................. 219/113

OTHER PUBLICATIONS

Metals Handbook, 8th Edition, vol. 6, Welding and Brazing, pp. 177–186, on Percussion Welding, published by American Society for Metals, Metals Park, Ohio.

Primary Examiner—C. C. Shaw
Attorney, Agent, or Firm—William Freedman

[57] ABSTRACT

This percussion welding power supply supplies welding energy through an arc between two work pieces that are forced together during or immediately following arcing. The power supply comprises a welding transformer having a primary winding and a secondary winding. Across the secondary winding, welding electrodes are connected for supplying welding current between the secondary winding and the pair of work pieces to be welded together. The power supply further comprises a capacitor bank having a pair of output terminals and means comprising electronic switching means in series with the primary winding and the output terminals for selectively connecting the output terminals across the primary winding. Control means is provided for rendering the switching means conductive, thereby causing the capacitor bank to discharge through the switching means and the primary winding to effect a welding operation. A tuning inductance in series with the switching means and the primary winding controls the duration and wave form of the capacitor-discharge.

6 Claims, 1 Drawing Figure

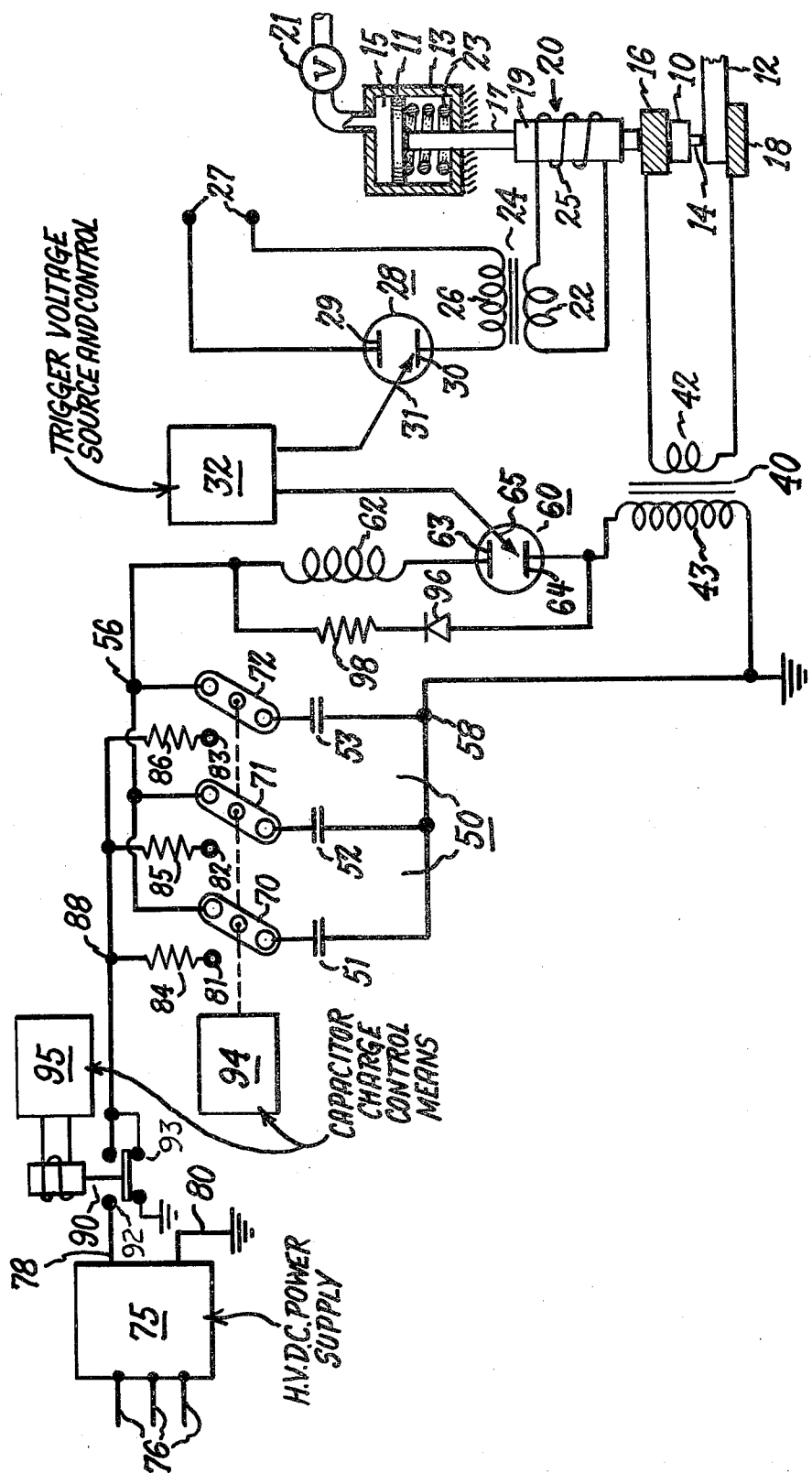

POWER SUPPLY FOR PERCUSSION WELDING

BACKGROUND

This invention relates to a power supply for supplying welding energy for a percussion welding operation and, more particularly, to a capacitor-discharge type of power supply for this purpose.

Percussion welding is an arc welding process in which: (a) the contact surfaces of two work pieces are heated and melted by an electric arc drawn between them, and (b) during or immediately following such arcing, the work pieces are rapidly driven together by a welding force to form a weld between the molten surfaces. A good general description of percussion welding can be found in the Metals Handbook, 8th Edition, Volume 6, pages 177–186, published in 1971 by the Amercian Society for Metals, Metals Park, Ohio. In one form of percussion welding, one of the work pieces is provided with a nib or small projection that is brought into engagement with the other work piece at the start of the welding operation. At a desired instant, a relatively high welding current is caused to flow between the two work pieces via the projection, rapidly heating the projection and causing it to disintegrate, thus forming an arc between the two work pieces in the region where the projection was located. This arc quickly melts the immediately-adjacent work-piece areas so that the work pieces are bonded together when these molten areas engage after being driven together by the welding force. The arc is extinguished when the work pieces reach engagement following arcing. The welding energy, as the term is used hereinafter, is that energy developed by current flowing through the arc prior to the work pieces' reaching engagement. This energy is, of course, directly dependent upon current, arc voltage, and the arcing time.

Some percussion welding power supplies derive their welding energy directly from a conventional a.c. source through a welding transformer without relying upon energy storage. Problems present with such a power supply are: (1) its operation imposes a sudden, large power drain on the a.c. source, especially when the supply line between the source and welding equipment is long, (2) the voltage available from the secondary of the welding transformer is severely limited and, as a result, is susceptible to being driven too rapidly to zero by the arc voltage developed upon arc-initiation, especially when welding refractory metals, which have characteristically high arc voltages, (3) this rapid decrease in voltage available from the secondary makes it difficult to develop the required high welding force in time to be applied while the work piece surfaces are still at the ideal temperatures for welding, and (4) the rapid decrease in secondary voltage makes it very difficult to develop a good weld over a large area, especially when welding refractory metals.

OBJECTS

Accordingly, an object of our invention is to provide a power supply for percussion welding that largely overcomes the problems described in the immediately-preceding paragraph.

Another object is to provide a power supply for percussion welding in which higher secondary voltages are available to overcome the arc voltages and in which the welding current magnitude and duration can be varied over a wide range to accommodate widely varying welding energy needs of different work pieces.

Another object of our invention is to provide a power supply for percussion welding that can provide exceptionally large amounts of welding energy for effecting such welds.

Another object is to provide a power supply for percussion welding that can be used to develop a good weld over an exceptionally large area.

Another object is to provide a power supply for percussion welding in which there is no need for precise timing between arc-initiation and the power supply input voltage.

We are aware of percussion welding power supplies that include one or more capacitors connected directly across the welding electrodes of the welder and that the use of capacitors in such power supplies does ameliorate some of the abovenoted problems, but this approach is usually limited by the need to limit the voltage developed across such a capacitor to a relatively low value for personnel safety reasons. With the voltage so limited, the size of such a capacitor needs to be unacceptably great in order to provide the welding energy needed for large-area welds.

Accordingly, another object is to accomplish the above stated objects without need to rely upon capacitance connected directly across the welding electrodes.

SUMMARY

In carrying out our invention in one form, we utilize a capacitance for supplying the welding energy for the percussion welding operation. However, this capacitance is not connected directly across the welding electrodes but instead is connected across the primary winding of the usual welding transformer. Charging means is provided for charging this capacitance to a predetermined voltage level in preparation for the welding operation. When welding energy is required, the capacitance is discharged through an oscillatory circuit including the primary winding of said welding transformer, such discharge being initiated by a normally non-conductive electronic switch connected in series with the primary winding and rendered conductive at the required time. A tuning inductance is connected in series with said switch and said primary winding and acts to shape the wave form of the above-described discharge of the capacitance through the primary winding.

BRIEF DESCRIPTION OF DRAWING

For a better understanding of the invention, reference may be had to the following description taken in conjunction with the accompanying drawing, wherein:

The single FIGURE is a diagrammatic showing of a power supply embodying one form of our invention.

DETAILED DESCRIPTION OF PREFERRED EMBODIMENT

Referring now to the drawing, there are shown two work pieces 10 and 12 which it is desired to weld together by percussion welding. In the illustrated embodiment, work piece 10 is a refractory metal contact of an electric circuit breaker, and work piece 12 is a conductive arm to which it is desired to weld the contact. The upper work piece 10 has a small downwardly-extending integral projection 14 on its lower face for engaging the lower work piece 12.

In preparation for the welding operation, the two work pieces 10 and 12 are placed between a pair of spaced-apart electrodes 16 and 18. Typically, these electrodes will take the form of jaws for securely holding and making good electrical contact with the work pieces, but we have shown the electrodes in a simplified block form. The lower electrode 18 is a stationary electrode and the upper one 16 is movable in a vertical direction by means comprising a pneumatically-operated piston 11 and a solenoid 20.

The piston 11 is mounted for vertical motion within a stationary cylinder 13 and is adapted to move downwardly into its illustrated position when the cylinder space 15 above the piston is pressurized. Downward force applied to the piston 11 is transmitted to the upper electrode 16 through a piston rod 17 to which the armature 19 of a solenoid 20 is attached. The pressure in the cylinder 15 is controlled by a suitable valve 21, which when opened allows pressurized air from a suitable source to flow into the space 15 and drive the piston 11 downwardly, forcing the upper electrode 16 toward the lower stationary electrode 18. The downward force developed by thus pressurizing the cylinder space 15 is a relatively modest one of, for example, a few hundred pounds, which is used simply for clamping the work pieces together initially. This clamping force can be released after completion of the welding operation by operating the valve 21 into a venting position, which releases the pressure in the space 15 and allows a suitable reset spring 23 to lift the piston 11 and terminate the clamping action.

The solenoid 20 comprises a winding 25 and the above-described armature 19. When the winding 25 is energized, it develops a magnetic field which applies a high downwardly acting force on the armature 19. This delivers a downward impact to the upper electrode 16 and the upper work piece 10. In a typical embodiment of the invention, this downward impact results in a downward force of several thousand pounds being applied to the upper work piece 10. In a preferred embodiment, the solenoid includes an air gap (not shown) in its magnetic circuit, which gap can be adjusted in length to provide means for controlling the magnitude and shape of the force developed by the solenoid.

The winding 25 of solenoid 20 is connected across the secondary winding 22 of a step-down transformer 24. The primary winding 26 of the transformer is connected across an a.c. source 27, e.g., a 440 volt source. In series with the primary winding 26 is an electronic switch, for example an ignitron tube or a silicon controlled rectifier (SCR). The illustrated embodiment uses an ignitron tube 28 having an anode 29, a cathode 30, and a trigger electrode 31. The ignitron tube 28 is normally non-conductive but is rendered conductive, or turned on, by applying a suitable triggering voltage to the trigger electrode 31 when the anode 29 is positive with respect to the cathode. The triggering voltage is derived from a conventional trigger voltage source 32. Turnon of tube 28 allows a pulse of current to pass via the step-down transformer 24 through the winding of solenoid 20, thus developing the above-described impact force for driving the upper electrode 16 downwardly toward the lower electrode 18.

Welding current for producing the desired weld is supplied through electrodes 16 and 18. This current flows through the work pieces 10 and 12, initially following a path through the small projection 14. This is a relatively high current that quickly disintegrates the small projection and develops an arc in this region between the then spaced-apart work pieces. This arc rapidly spreads out from its initial location, quickly heating the surrounding portions of the work pieces to welding temperature. Energization of the solenoid 20 is so timed that the work pieces are then being forced together by welding force derived from the solenoid 20; and when the heated surfaces reach engagement under the influence of this force, they are welded together.

The solenoid force, in driving the work pieces together, extinguishes the arc and also provides an impact between the two work pieces that facilitates bonding and also performs some forging action on the two work pieces in the immediate vicinity of the heated surfaces.

For supplying welding current to the electrodes 16 and 18, a step-down welding transformer 40 is provided. This welding transformer comprises a secondary winding 42, a primary winding 43, and an iron core 44 magnetically coupling these windings together. Typically, this transformer will have a turns ratio of about 20 to 1 to reduce the secondary voltage by a factor of 1/20th and to increase the secondary current by 20 times. The electrodes 16 and 18 are connected across the secondary winding 42.

Connected across the primary winding 43 of the welding transformer 40 is a capacitor bank 50. This capacitor bank comprises a plurality of capacitors 51, 52, and 53 adapted to be connected in parallel with each other. The capacitor bank has a pair of output terminals 56 and 58 across which the primary winding 43 is connected.

In series with the primary winding 43 is the series combination of an electronic switch 60 and a tuning inductor 62. The electronic switch 60 could be either an SCR or an ignitron tube. In the illustrated embodiment, we use an ignitron tube 60 generally corresponding to the previously-described ignitron tube 28. Accordingly, ignitron tube 60 comprises an anode 63, a cathode 64, and a trigger electrode 65. The ignitron tube 60 is normally non-conductive but is rendered conductive by applying a suitable trigger voltage signal to the trigger electrode 65. This trigger voltage signal is derived from source 32 and is applied in suitable timed relationship to the trigger signal applied to the trigger electrode 31 of tube 28.

The upper terminal of each capacitor 51, 52, and 53 is adapted to be connected to the upper terminal 56 of the capacitor bank 50 by means of a two-position transfer switch provided for each capacitor. These switches are designated 70, 71, and 72, respectively. These switches 70, 71, and 72, are shown in the position they occupy when the capacitors 51, 52, and 53 have been charged to the desired voltage level. If the electronic switch 60 is fired while the transfer switches are so positioned, the capacitors will discharge in parallel through primary winding 43 of the welding transformer via the components 60 and 62, thus supplying the desired welding current.

If the voltage level on the capacitor bank 50 is below a preselected level, the capacitors are charged to restore the voltage to the predetermined level, following which charging is discontinued. For effecting such charging, a high voltage d.c. power supply 75 of a conventional design is provided. The input to this power supply 75 is a three-phase a.c. circuit 76, typically of 440 volts. An adjustable d.c. output voltage, typically in the range of 2000 volts, is developed across its output terminals 78 and 80.

When the capacitor bank requires charging, the transfer switches 70, 71, and 72 are shifted to the left to contact their stationary contacts 81, 82, and 83, respectively, and this connects charging resistors 84, 85, and 86, respectively, in series with the capacitors 51, 52, and 53. The charging resistors are connected to a common bus 88, and this bus is connected to the upper terminal 78 of the power supply by means of a contactor 90 having normally-open contacts 92.

While the transfer switches 70, 71, 72, are in their shifted-to-the left position, the resistors 85 serve to equalize the charge on the capacitors and also to prevent excessively rapid discharge of the capacitors through any failed capacitor should one of them, for some reason, fail. It is noted that the contactor 90 has a set of normally-closed contacts 93 that serve to drain any significant residual charge from the capacitor bank 50 when switches 70-72 are in their shifted-to-the left position and contactor 90 is dropped out. This is a safety feature that reduces the chance of the bank 50 being in a charged state when exposed during maintenance.

Capacitor charge-control means 94 and 95 respectively control the transfer switches 70, 71, 72 and the contactor 90. These two control means, which can be of a suitable conventional design, operate the transfer switches 70, 71, and 72 and the contactor 90 to effect capacitor-charging when the voltage on the capacitor bank falls below a preselected level. Control means 94 first shifts the transfer switches to the left onto their resistor contacts 81, 82, 83, and then control means 95 operates the contactor 90 to connect the capacitor bank across high voltage d.c. source 75. This allows the source to charge the capacitors 51, 52, and 53 through the resistors 84, 85, and 86. When the capacitor voltage reaches the above-referred-to predetermined level, the contactor opens its contacts 92 to discontinue the charging operation, immediately following which the transfer switches are shifted to the right to their illustrated positions in readiness for a subsequent capacitor-discharge operation.

As previously pointed out, when the electronic switch 60 is rendered conductive, the capacitor bank 50 discharges through the primary winding 43 of the welding transformer. This surge of unidirectional current drives the core 40 of the transformer toward a state of saturation. Without a flux-reset feature (to be described), the core would soon be saturated by repeated unidirectional discharges of the capacitor bank 50. To prevent such saturation, we reset the flux level in the core after each such discharge by passing current through the primary winding 43 in a reverse direction immediately after each such discharge. This is made possible by the fact that discharge of the capacitor bank 50 reverses the charge on the capacitor bank, driving the upper terminal 56 to a much more negative voltage than the lower terminal 58, following which the capacitor bank discharges in a reverse direction through the primary winding 43. This reverse current cannot flow through the electronic switch 60, since switch 60 is a unidirectional device which returns to its normally non-conducting state when the forward current therethrough falls to a value near zero. To permit this reverse current to flow through the primary winding 43 and thereby reset the flux level in the core 40, we provide the series combination of a diode 96 and a resistor 98 in parallel (and, more specifically in inverse parallel relationship) with the electronic switch 60 and the tuning inductance 62. Thus, the above-described reverse current can flow through the series combination of primary winding 43, diode 96, and resistor 98, thereby resetting the flux level in the core 40. The resistance value of resistor 98 is chosen so that the reverse current has a relatively long time constant. A typical value for this resistance is 250 ohms.

The discharge circuit for the capacitor bank 50 that extends through the electronic switch 60, tuning inductor 62, and primary winding 43 is an oscillatory circuit since its resistance R is less than $2\sqrt{L/C}$, where L is its inductance and C is its capacitance. The discharge current through this circuit varies through a positive loop, crossing zero in a negative-going direction and reversing the charge on the capacitor bank 50. The discharge circuit for the reverse charge, which circuit extends through primary winding 43, diode 96, and resistor 98, is an overdamped circuit since its resistance R exceeds $2\sqrt{L/C}$ for the circuit.

As pointed out hereinabove under "Background", there is a conventional form of percussion welding power supply that derives its energy directly from an a.c. source through a transformer without using electrical energy storage. Problems encountered sich such a percussion welding power supply are set forth in that "Background" section. Our power supply is able to overcome the sudden power drain problem, referred to therein, since it slowly stores energy in the capacitor bank 50 in preparation for a welding operation, rather than demanding all of the required welding energy from the source during the welding operation. Also, the voltage available from the secondary winding of our welding transformer 40 is much higher than that available from the secondary winding of practical forms of the prior power supply. This higher voltage enables us to prolong the arcing period to the desired extent without being limited by the arcing current's being prematurely driven to zero by an arc voltage which is high relative to the transformer secondary voltage. By making available this longer arcing period, it is easier to develop and apply the required welding force at an appropriate time and also to develop larger area welds when needed.

Our power supply is able to deliver far more welding energy than the conventional power supplies referred at the start of the immediately-preceding paragraph because our capacitor bank (50) can store and deliver substantially greater amounts of energy than can practically be derived directly from the a.c. source (such as 76) that is usually available for welding. Although we have shown three capacitors 51, 52, and 53 in our capacitor bank 50, this is intended only to be a schematic illustration. As many capacitors as desired may be utilized to store and subsequently deliver the desired amount of welding energy. Such additional capacitors can be connected in parallel with those shown, and each can be provided with a charging resistor corresponding to resistor 84, 85, or 86 shown, a transfer switch corresponding to the transfer switch 70, 71, or 72 shown, and a suitable coupling to the control means 94 shown so as to be operable by the control means 94 simultaneously with the other transfer switches. It is, of course, to be understood that although each capacitor 51, 52, or 53 is shown as a single capacitor, this is a schematic showing, and each such capacitor can comprise a plurality of capacitors connected in series and/or in parallel.

In prior percussion welding apparatus, the arc formed upon disintegration of the projection has been able to spread out over only a restricted area before the welding current was forced to near zero by the effect of the arc voltage overcoming the relatively low transformer secondary voltage; but with our illustrated welding supply the arc has been able to spread out over much larger areas during the longer available arcing interval, and this has contributed to larger welding areas than have typically been available from prior percussion welding power supplies.

We recognize that certain prior percussion welding power supplies have included one or more capacitors connected directly across the welding electrodes (16 and 18) of the welder, but this approach is usually limited by the need to limit the voltage developed across a capacitor in this location to a relatively low value for personnel safety reasons since this circuit is a relatively exposed circuit. Because this voltage must be low, the size of such a capacitor would have to be unacceptably great in order to provide the welding energy needed for the large-area welds we are seeking and, in fact, are able to produce with our illustrated power supply.

Our power supply, it is to be noted, uses a capacitor bank on the primary side of the welding transformer 40, and thus we can charge our capacitor bank to much higher voltages than would be permissible if it was on the secondary side. This enables us to materially reduce the size of the capacitance bank needed for a corresponding amount of welding energy. This higher voltage presents no significant personnel hazard because the circuitry on the primary side of the welding transformer is normally enclosed in a protective housing and does not need to be exposed to an operator in the manner that the welding electrodes (16, 18) need to be. Such a protective housing is, of course, required even in those welding power supplies having no capacitor bank.

While discharging the capacitor bank (50) through the primary winding of the welding transformer and the unidirectional electronic switch 60 does act to drive the transformer core toward saturation, we are able to avoid significant ill effects of this because we restore the flux level in the core to an appropriate low value after each capacitor discharge via switch 60, through the use of the flux-reset means 96, 98 as described hereinabove.

It is to be understood that our welding power supply readily lends itself to making adjustments in the amount of welding energy supplied for each welding operation. Such adjustments can be made by switching in more capacitors (not shown) corresponding to the capacitors 51, 52, and 53, as described hereinabove, or by changing the voltage level to which the capacitors are normally charged, or by changing the timing between firing of the ignitron tubes 60 and 28 to change the timing between the supply of welding current and welding force, or by adjusting the inductance of tuning inductor 62. Adjustments in welding current and voltage can also be made by changing taps (not shown) on the welding transformer 40 to change the turns ratio of the transformer.

Although we have shown magnetic means (20) for supplying the primary welding force, other appropriately-timed conventional force generating means can be used, such as spring or pressure-operated devices.

The following are specific examples of welding parameters that have been used in making particular welds with equipment corresponding to that illustrated.

EXAMPLE I

A $\frac{3}{4}$ inch diameter copper contact was welded to a copper support, with a weld developed over substantially the entire interface. To effect this weld, we used a capacitor bank (50) with a capacitance of 3600 microfarads, a capacitor voltage of 2000 volts, a tuning inductance (62) of 45 microhenries, and a weld transformer (40) having a 20 to 1 turns ratio. The initial force on the work pieces from the piston 11 was about 400 pounds and the solenoid force was first applied substantially simultaneously with arc-initiation, building up to about 5000 pounds by the end of the arcing period. The maximum arc current was 130,000 amperes, and the arcing time was about 1.5 milliseconds. The arc voltage at arc-initiation was about 65 volts.

EXAMPLE II

A silver-molybdenum contact $\frac{7}{8}'' \times \frac{1}{2}''$ was welded to a copper support, with a weld developed over substantially the entire interface. In effecting this weld, we used a capacitor bank with a capacitance of 4800 microfarads, a capacitor voltage of 2000 volts, a tuning inductance of 45 microhenries, and a welding transformer (40) having a 20 to 1 turns ratio. The initial force on the work pieces from the piston 11 was about 500 pounds and the solenoid force was first applied substantially simultaneously with arc-initiation, building up to about 5000 pounds by the end of the arcing period. The maximum arc current was 138,000 amperes and the arcing time was about 2 milliseconds. The arc voltage at arc-initiation was about 60 volts.

It is to be noted that all of these welds referred to in the Examples were high quality welds covering substantially the entire interface between the parts welded together. These welds have an area larger by about 100 percent or more than the largest welds of equivalent quality between similar parts that we have been able to produce with prior equipment similar to that shown except without the capacitive energy storage means (50), the tuning inductance (62), and flux-reset means (96, 98).

Another advantage of locating the capacitor bank 50 and the tuning inductor 60 on the primary side of the welding transformer 40 is that the tuning inductor 62 may have a much lower current-carrying capability and be much smaller in size than would be the case if located on the secondary side since the primary currents are much lower than the secondary currents.

While we have shown and described particular embodiments of our invention, it will be obvious to those skilled in the art that various changes and modifications may be made without departing from our invention in its broader aspects; and we, therefore, intend herein to cover all such changes and modifications as fall within the true spirit and scope of our invention.

What we claim is:

1. In percussion welding equipment in which an electric arc is initiated between a pair of spaced-apart work pieces during the early stages of a welding operation and means is provided for applying to one of said work pieces a welding force that drives said work pieces together following arc-initiation and subsequent spread-out of the arc, thereby driving into engagement regions of the work pieces that have been heated to welding temperature by said arc, a power supply for supplying welding energy through said arc comprising:

(a) a welding transformer having a primary winding and a secondary winding across which welding electrodes are adapted to be connected for supplying maximum welding current of 100,000 amperes or more between said secondary winding and said pair of work pieces, (b) a capacitor bank having a pair of output terminals,
(c) means for selectively connecting said output terminals across said primary winding comprising electronic switching means connected in series with said primary winding and said terminals,
(d) means for charging said capacitor bank to a predetermined voltage level in preparation for a welding operation and for discontinuing charging when said voltage level is reached,
(e) means for rendering said switching means conductive, thereby causing said capacitor bank to forwardly discharge through said switching means and said primary winding to effect a welding operation, and
(f) means for controlling the duration of said discharge comprising a tuning inductance connected in series with said switching means and said primary winding.

2. The combination of claim 1 in which:
(a) said electronic switching means permits conduction in only a single direction upon being rendered conductive,
(b) said transformer has a core magnetically coupling said primary winding and said secondary winding, said core being driven toward saturation by said forward discharge of the capacitor bank through said primary winding via said electronic switching means, and
(c) flux-reset means is provided for resetting the flux level in said core immediately following said forward discharge, said flux-reset means comprising in parallel with said electronic switching means, the series combination of a resistor and a unidirectional conducting device connected in series with said primary winding across said capacitor; the unidirectional conducting device conducting current from reverse discharge of said capacitor that passes through said primary winding in the opposite direction from the direction of the current passing through said primary winding during conduction by said switching device.

3. The combination of claim 2 in which said series combination of said resistor and said unidirectional conducting device are connected in parallel with the series combination of said electronic switch and said timing inductance.

4. The combination of claim 1 in which the circuit through which said capacitor bank discharges via said electronic switch, said tuning inductor, and said primary winding is an underdamped oscillatory circuit.

5. The combination of claim 2 in which:
(a) the circuit through which said capacitor bank discharges via said electronic switch and said primary winding is an underdamped oscillatory circuit through which current passes in one direction and reverses the charge on said capacitor bank, and
(b) said reverse charge on said capacitor bank discharges through said primary winding via said series combination of resistor and unidirectional conducting device.

6. Percussion welding equipment comprising the power supply of claim 1 and further characterized by the use of a small projection on one of said work pieces for engaging the other work piece and providing a conductive path between said work pieces through which welding current initially flows upon capacitor discharge and causes disintegration of the projection and formation of said arc between the work pieces in the region where the projection was located, the welding equipment further comprising means for applying to one of said work pieces the welding force that drives said work pieces together following arc-initiation and subsequent spread-out of said arc.

* * * * *